United States Patent
Dunn et al.

(10) Patent No.: US 6,324,280 B2
(45) Date of Patent: *Nov. 27, 2001

(54) OPTIMUM ROUTING OF CALLS OVER THE PUBLIC SWITCHED TELEPHONE NETWORK AND THE INTERNET

(75) Inventors: James Patrick Dunn, Sandwich; Jack Kozik, Naperville, both of IL (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,809

(22) Filed: May 5, 1998

(51) Int. Cl.[7] .................................................. H04M 7/00
(52) U.S. Cl. .................... 379/230; 379/221.01; 370/352; 370/389
(58) Field of Search ................ 379/230, 207.01–207.16, 379/219, 220.01, 221.01–221.15, 229, 90.01, 93.01, 93.09; 370/352, 389, 390, 392

(56) References Cited

U.S. PATENT DOCUMENTS

| | | | |
|---|---|---|---|
| 5,923,659 | * 7/1999 | Curry et al. | 370/401 |
| 5,946,386 | * 8/1999 | Rogers et al. | 379/265 |
| 5,987,633 | * 11/1999 | Newman et al. | 714/712 |
| 5,991,389 | * 11/1999 | Ram et al. | 379/230 |
| 5,999,525 | * 12/1999 | Krishnaswamy et al. | 370/352 |
| 6,014,379 | * 1/2000 | White et al. | 370/389 |
| 6,021,126 | * 2/2000 | White et al. | 370/352 |
| 6,038,309 | * 3/2000 | Ram et al. | 379/229 |
| 6,064,653 | * 5/2000 | Farris | 370/237 |
| 6,076,121 | * 6/2000 | Levine | 710/62 |
| 6,078,582 | * 6/2000 | Curry et al. | 370/356 |
| 6,097,804 | * 8/2000 | Gilbert et al. | 379/230 |
| 6,122,255 | * 9/2000 | Bartholomew et al. | 370/237 |
| 6,122,364 | * 9/2000 | Petrunka et al. | 379/265 |
| 6,131,095 | * 10/2000 | Low et al. | 707/10 |
| 6,141,341 | * 10/2000 | Jones et al. | 370/352 |

FOREIGN PATENT DOCUMENTS

| | | | | |
|---|---|---|---|---|
| 0732835 | 9/1996 | (EP) | | H04L/29/06 |
| WO9738551 | 10/1997 | (WO) | | H04Q/11/04 |

* cited by examiner

*Primary Examiner*—Ahmad Matar
*Assistant Examiner*—Benny Q. Tieu
(74) *Attorney, Agent, or Firm*—Werner Ulrich

(57) ABSTRACT

A method and apparatus for selectively establishing a connection via a telephone network, or via the Internet. A network access switch decides whether to use the telephone network or the Internet. If connections are established using the Internet, the establishment of connection is controlled using existing CCS7 interoffice signaling messages. Advantageously, this permits most of the switching control software to be retained and allows the access switches to interface with the present array of operations support systems.

19 Claims, 3 Drawing Sheets

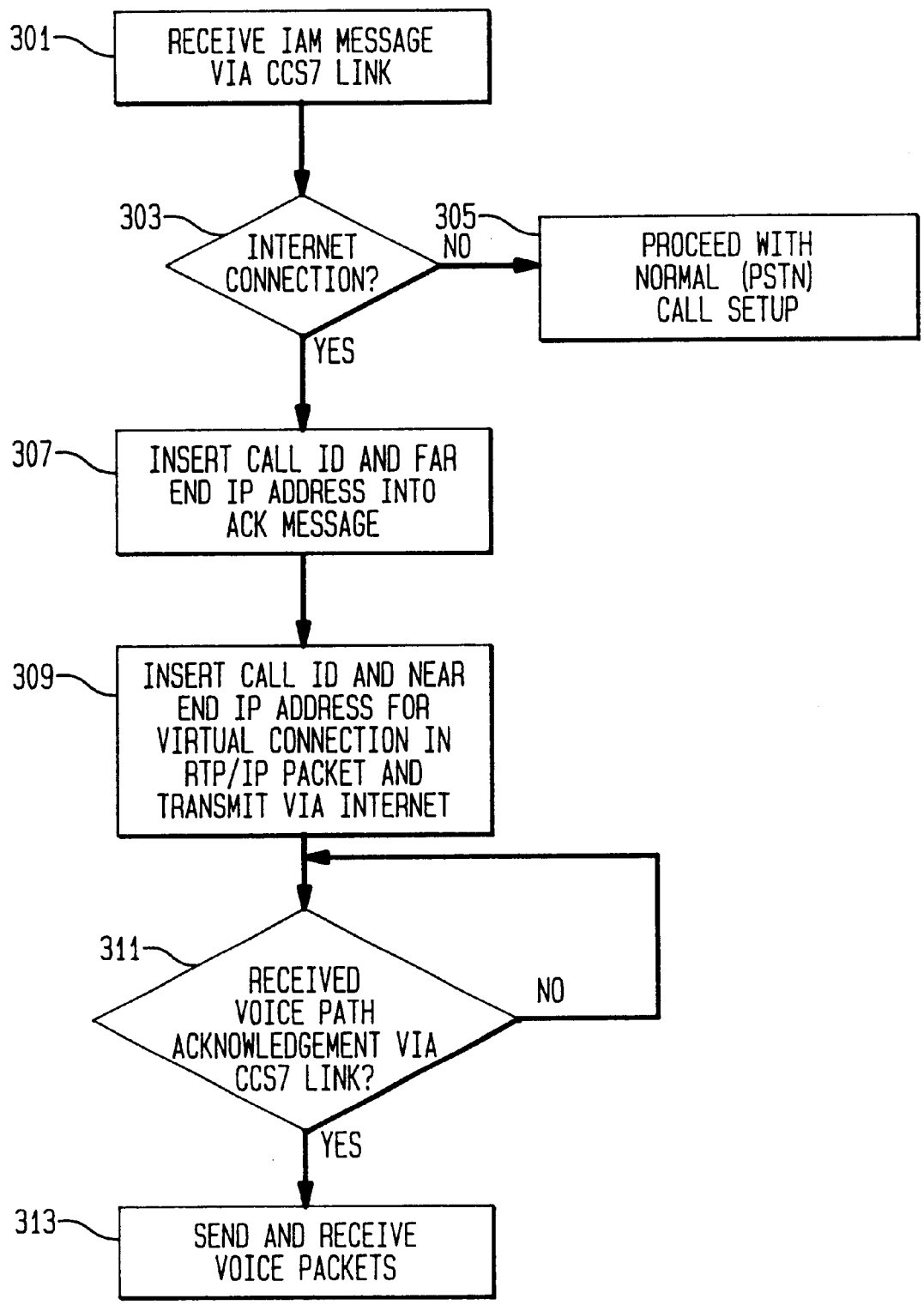

OPTIMUM ROUTING OF CALLS OVER THE PUBLIC SWITCHED TELEPHONE NETWORK AND THE INTERNET

TECHNICAL FIELD

This invention relates to arrangements for switching calls from central offices switches to the public switched telephone network, or to a fast packet network such as the Internet, in such a way as to incur lowest costs for a call.

PROBLEM

The Internet has made it possible to use a radically different network for carrying voice calls. This network is becoming cost competitive with the public switched telephone network.

SOLUTION

Applicants have recognized that a problem with the prior art is that it is difficult to assign individual calls served by a central office switching system to a choice of the Internet and the public switched telephone network. The problem is especially aggravated by the difficulty of making extensive changes in the call routing arrangements because of the widespread use of different standard protocols for use with the public switched telephone network, and for use with the Internet.

The above problem is solved and an advance is made over the prior art in accordance with this invention wherein a decision is initially made in an originating switching system to select a public switched telephone network trunk, or an Internet connection; if an Internet connection is selected, an interoffice signaling message such as the CCS7 initial address message, (IAM), contains both a call identification, and an Internet Protocol (IP), address of the originating switch. The terminating switch in its acknowledgment, returns an Internet Protocol address of the terminating switch for a communication session. The originating office then sends an identification of the call, in this embodiment the prior art PSTN (Public Switched Telephone Network) circuit identifier code, and of the far end IP address in a real time protocol/IP (RTP/IP) packet over the Internet to the terminating switch. The terminating switch then is able to associate the Internet connection with the type of information that has been received in the IAM over the CCS7 network; the terminating switch is able to complete the connection from the terminating switch to the called customer using the information in the IAM in the standard way. The voice packets sent and received over the Internet are then interfaced in the originating switch and the terminating switch with a Vocoder which converts these Internet packets into a PCM (pulse code modulation) bit stream for transmission to the calling and called customers' switches, thence, as an analog signal or PCM digital telephone signal to the customers. Advantageously, even though the call is being served by Internet facilities, the call set-up operations can be performed in basically the same way that they are performed using only the public switched telephone network, (PSTN), so that the effect on the call processing program is minimized. In addition, the path across the Internet is verified by an exchange of call identifications and Internet addresses in both directions.

The changes in the call processing program and procedures include:

1. Internet Protocol (IP) address administration is required.

2. Vocoders must be connected to calls routed over the Internet.

3. Matching Vocoders must be selected in the two switches terminating an Internet connection.

4. The IP address is validated to secure the Internet against intrusion by unauthorized users (hackers).

5. Call identification numbers and IP addresses of the two ends are bonded.

6. An IP address field must be added to the IAM (Initial Address Message) and ACK (Acknowledgment) messages.

7. A new class of service is added for Internet connections.

8. New billing options can be provided for Internet connections.

However, advantageously, by using procedures that are linked to the type of call setup used with the PSTN (Public Switched Telephone Network), the existing array of Operations Support Systems can continue to be used for operations, administration, maintenance, installation, traffic measurements, and provisioning. For example, the "no circuit available" counts maintained for most trunk groups can be used as they are today, to request the addition of trunks, or, in this case, addition of Internet network capacity.

BRIEF DESCRIPTION OF THE DRAWING

FIG. 3 is a flow diagram illustrating operations at a terminating switch.

DETAILED DESCRIPTION

Figure 1:
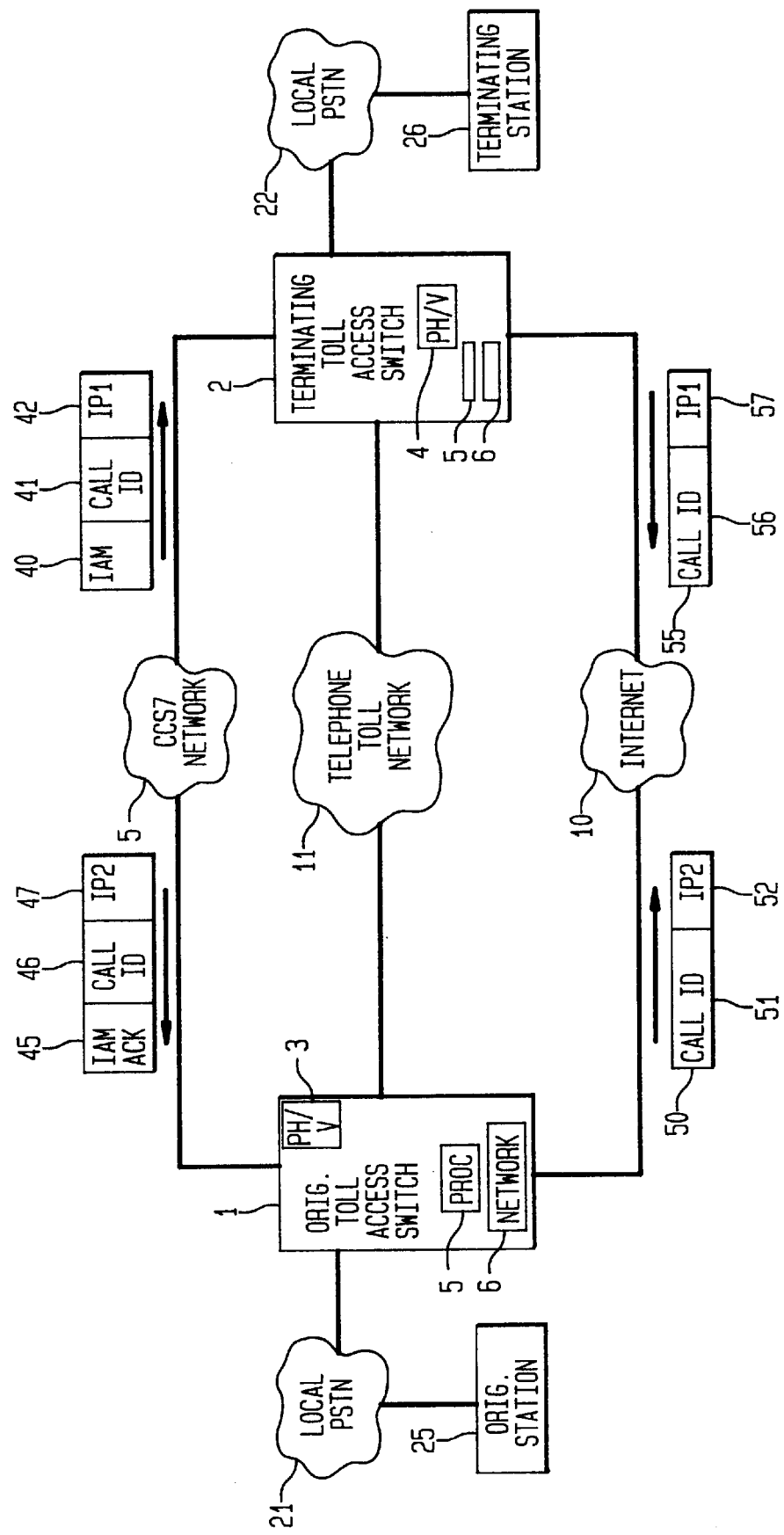
FIG. 1 is a block diagram illustrating the basic operation of Applicants' invention.

FIG. 1 illustrates the operation of Applicants' invention. An originating station 25 is connected via a local public switched telephone network 21 to an originating toll access switch 1. The toll access switch 1 contains a Protocol handler/vocoder 3 for interfacing between Internet voice packets, and the pulse code modulation, (PCM), bit stream received from the local PSTN 21. Note that in some cases the originating station may be directly connected to the toll access switch 1. The toll access switch of this example is a specific example of a network access switch, i.e., a switch for accessing a network such as the Internet or a toll network.

Each of the toll access switches has a program controlled processor, such as processor 5 of switch 1, for controlling establishment of Internet and telephone network connections, receiving and controlling transmission of interoffice signaling messages. Each switch also has a switching network such as network 6 of switch 1 for establishing connections between the incoming local PSTN and the Internet or the toll network.

The terminating station 26 is connected via local PSTN 22 to the terminating toll access switch 2, which contains a protocol handler/vocoder 4 for interfacing between the voice packets transmitted over the Internet 10, and a PCM stream to the local PSTN 22. Note that at the terminating end also the terminating station 26 may be directly connected to the terminating toll access switch 2.

When the originating switch 1 receives a request to establish a connection from originating station 25, the originating toll access switch 1 first tests whether the call should be sent over the telephone toll network 11 which interconnects originating toll access switch 1, and terminating toll access switch 2, or via the Internet 10, which also interconnects the two toll access switches. The decision on whether to select the telephone toll network 11, or the Internet 10, can be based on a number of factors. One of the most important factors is the charge for the use of the Internet, or the telephone toll network; if the owner of the toll access switch is not also the owner of the telephone toll network, then the charges for the telephone connection should probably be competitive, otherwise, only one of the two networks will be used. Another factor which is taken into account in making the decision on how to route the call, is the present state of the two networks, whether either one is presently overloaded. In addition to these decisions which are based on the sate of the Internet and telephone network, the decision can be based on customer input. A customer may have a class of service which requires that all toll calls are routed over the Internet, or that all toll calls are routed over the telephone network. Additionally, dialed information, such as one or more preliminary digits or symbols, can be used to specify that a particular call or series of calls are to be routed over the Internet, or are to be routed over the telephone network.

In accordance with this embodiment, the well known standard H.323 protocol is used for actually transmitting data representing voice on established stable calls. However, protocols using CCS7 signaling are used to establish the connection. In this embodiment, CCS7 is the interoffice signaling system of choice. Advantageously, the protocols using CCS7 are in existence and have already been integrated into the software of the toll access switches. This allows, for example, interfaces with existing operations support systems, to be essentially maintained. In contrast, a great deal of new software would be required to try to implement call set-up using the prior art H.323 protocol.

If the originating toll access switch decides to route the call over telephone network 11, this function is carried out in the manner of the prior art. If, however, the decision is made to route the call over the Internet 10, then a series of packets are exchanged between the originating toll access switch 1, and the terminating toll access switch 2. Initial address message, (IAM 40) is sent from the originating toll access switch 1 to the terminating toll access switch 2 over the CCS7 network 5. The IAM 40 contains a call identifier 41, and in accordance with the principles of Applicants' invention also contains the Internet Protocol address of switch 1, (IP 1), in field 42 of the IAM 40. In response to receipt of IAM 40, terminating toll access switch 2 returns an IAM acknowledgement message 45, which also contains the call identifier 46, and in accordance with Applicants' invention, the Internet Protocol address, IP 2, of the terminating toll access switch 2 in field 47. As a result of this exchange of initial address message and acknowledgment, both the originating and the terminating access switch have been informed of each other's Internet Protocol address, and the terminating toll access switch has been informed of the identification of the terminating station, (in the initial address message), so that the terminating toll access switch can subsequently establish a connection via local PSTN (Public Switched Telephone Network) 22 to the terminating station 26. Next, in order to establish an Internet connection between switches 1 and 2, switch 1 sends a packet, including the call identification, and including the identification of switch 2, (IP 2), over the Internet 10 to terminating toll access switch 2. Terminating toll access switch 2 responds by returning a packet including the call identification, and headed by the identification of switch, (IP 1), and the two switches are enabled to communicate over the Internet since each knows the other's identification, and since the packets for the conversation can be tagged by the call identification. The call set up is completed when switch 2 sends the standard CCS7 Setup Complete Message when Station 26 goes off-hook.

Figure 2:
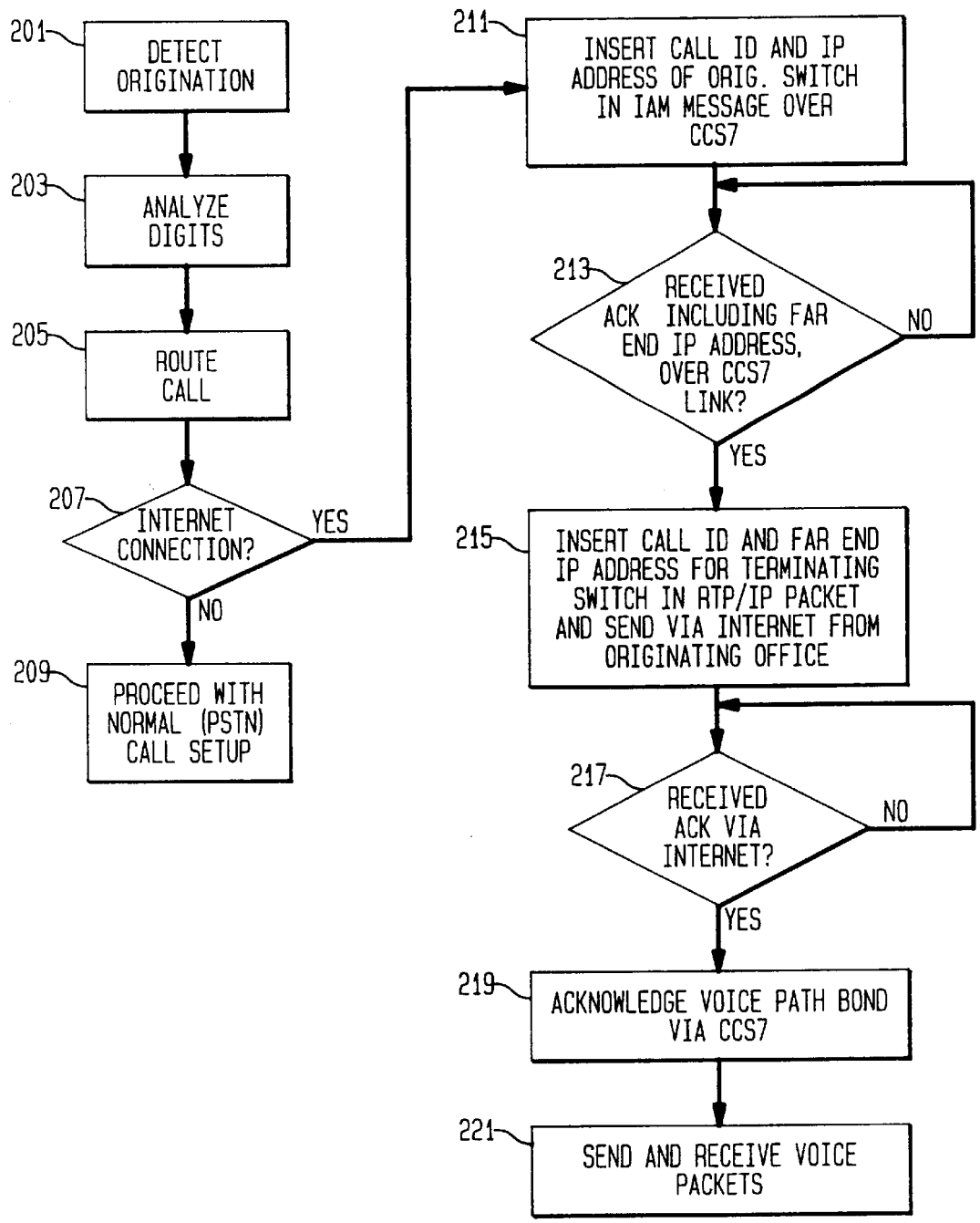
FIG. 2 is a flow diagram illustrating operations at an originating switch.

FIG. 2 is a flow diagram illustrating operations performed in the originating toll access switch. The origination is detected, (Action Block 201), and the toll access switch analyzes the digits of the call, (Action Block 203). The originating toll access switch then makes the decision of how to route the call, (Action Block 205). Test 207 is used to determine whether the decision has been made to route the call over the Internet. If a decision has been made to not route the call over the Internet, then normal call set-up is performed, (Action Block 209). If a decision has been made to use the Internet for routing the call, then an initial address message (IAM) is generated which includes the Internet Protocol address of the originating switch, (Action Block 211). This message is sent over the CCS7 network. Test 213 determines whether the originating toll access switch received an acknowledgment, a return from the far end, i.e., the terminating toll access switch. If not, an attempt is repeated to send the IAM message. If an acknowledgment has been received, then the acknowledgment had returned the Internet Protocol address of the terminating toll access switch, (see below with respect to Action Block 307). The originating toll access switch then inserts the call identification of the call, and the far end Internet Protocol address into a Real Time Protocol/Internet Protocol, (RTP/IP), packet and sends this packet over the Internet with the address of the far end terminating toll access switch, (Action Block 215). Test 217 determines whether an acknowledgment to that RTP/IP packet had been received over the Internet; if not, then the originating switch waits a certain amount of time before making a second attempt to send the packet. CCS7 procedures, including Acknowledgment timers are used when necessary to force call abandonment. Once the acknowledgment has been received over the Internet, (note that the sending toll access switch knows where to send the acknowledgment because it has previously received IP-1 and the identity of the originating toll access switch in the IAM transmitted over the CCS7 network). A voice path bond exists between the two switches and this bond is acknowledged via a CCS7 message, (Action Block 219). The bond messages are packets 50 and 55 (FIG. 1); the bond comes from validating that the values correspond in both switches. The two switches are now ready to send and receive voice packets which in their respective Vocoders will be converted into PCM streams for transmission to the originating and terminating stations, (Action Block 221).

FIG. 3 is a flow diagram illustrating operations performed by the terminating toll access switch. The terminating toll access switch is first informed of the call by receiving an IAM message, (transmitted in Action Block 211, FIG. 2), over the CCS7 network, (Action Block 301). Test 303 is used to determine whether an Internet connection has been selected. This decision can be made based on whether or not there is an IP address in the IAM message. If not, then normal call set-up procedures are used, (Action Block 305). If it is recognized that the connection is to be established using the Internet, and this is recognized because an Internet Protocol address has been included in the received IAM message, then the terminating toll access switch sends an acknowledgment message which includes the call identifier to associate the message with the proper call, and the IP address of the terminating toll access switch (Action Block 307). Subsequently, the terminating toll access switch sends an RTP/IP packet, including the call identifier, the IP address of the originating toll access switch, and an RTP/IP packet transmitted via the Internet to the originating toll access switch.

Note that a toll access switch may have several IP addressees representing different segments of the trunk plant connected to the Internet. Only the IP address of the selected group of trunks is sent and is used for this connection.

Test 311 is then used to determine whether a voice path acknowledgment has been received over the CCS7 link, (this corresponds to the message sent in Action Block 219, FIG. 2). If so, then the two switches are ready to send and receive voice packets.

The above arrangements can also be used for private networks, wherein private network access switches replace the toll access switches. Such private network can use private facilities; private facilities may be dedicated, leased, or leased for periods of time.

This preferred embodiment uses the protocols described above. Other protocols such as ISUP which is supported by CCS7 can also used for some, or all of the steps described above.

More than one IP address can be used by an originating switch to communicate with a terminating switch. For example, if several different Internet subnetworks connect the two switches, a different IP address would be used for each subnetwork to ensure that a call is transmitted over a selected subnetwork.

The above is only one preferred embodiment of Applicants' invention. Many alternatives will be apparent to those of ordinary skill in the art. The invention is only limited by the attached Claims.

What is claimed is:

1. A method of establishing a voice connection between a subscriber connected to an originating switch, and a subscriber connected to a terminating switch, both switches having access to a telephone network and the Internet, comprising the steps of:

responsive to receipt of a request to establish a voice telephone connection for a call which can be established over the telephone network or the Internet, determining whether to establish the connection using a telephone network, or using the Internet;

if a decision is made to establish the connection using the telephone network, establishing the connection in accordance with procedures of the prior art;

if a decision is made to establish the connection using the Internet for transmitting an (IAM) initial address message over an inter-office signaling network to the terminating switch, the IAM including an Internet Protocol address of the originating switch;

responsive to receipt of said IAM, transmitting an acknowledgment message comprising an IP (Internet Protocol) address of said terminating switch over said interoffice signaling network;

establishing an Internet connection for carrying voice signals between said originating and said terminating switch, using said IP addresses; and confirming establishment of said connection by another interoffice signaling message between the two switches sent over said inter-office signaling network;

wherein the determining step comprises the step of determining based on the relative traffic states of the Inernet and the telephone network, or based on dialed caller input, or based on caller class of service.

2. The method of claim 1 wherein said telephone network is a private network, and the step of establishing the connection in accordance with procedures of the prior art comprises the step of establishing a private network connection in accordance with procedures of the prior art for private network connections.

3. The method of claim 1 wherein said Internet connection is established over a private Internet Protocol network.

4. The method of claim 1 wherein the step of establishing an Internet connection comprises the step of:
checking that a call identifier returned in the acknowledgment message is the same as a call identifier sent in the IAM.

5. The method of claim 1 further comprising the steps of:
selecting an IP address in the switch transmitting said IAM;
selecting a different IP address in the switch transmitting said acknowledgment message; and
changing to said different IP address in the switch transmitting said IAM.

6. The method of claim 1 wherein said interoffice signaling network is a CCS7 network.

7. The method of claim 1, wherein said subscribers need not be provided with Internet service.

8. The method of claim 1, wherein at least one of said originating and terminating switches is a toll access switch.

9. In an originating network access switch, apparatus for controlling the establishment of a voice connection to a terminating network access switch, wherein both network access switches have access to a telephone network and the Internet, comprising:

means for accessing an interoffice signaling network;

means for establishing a voice connection to said telephone network;

means for establishing a connection to the Internet;

processor means for controlling transmission of messages over said interoffice signaling network, for receiving messages from said interoffice signaling network, and for controlling said means for establishing a connection in said originating network access switch;

said processor means, operative under program control for:

responsive to receipt of a request to establish a telephone connection for a call which can be established over the telephone network or the Internet, determining whether to establish the connection using a telephone network, or using the Internet;

wherein determining comprises determining based on the relative traffic states of the Internet and the telephone network, or based on dialed caller input, or based on caller class of service;

if a decision is made to establish the connection using the telephone network, establishing the connection in accordance with procedures of the prior art;

if a decision is made to establish the connection using the Internet, controlling transmission of an initial address message over said interoffice signaling network to the terminating access switch, the IAM (initial address message), including an Internet Protocol address of the network access switch;

responsive to receipt of an acknowledgment message from said terminating access switch, said acknowledgment message comprising an IP (Internet Protocol) address of said terminating access switch over said interoffice signaling network, controlling the establishment of an Internet connection for carrying voice signals between said originating network access switch and said terminating network access switch, using said IP addresses; and confirming establishment of said connection by controlling transmission of another interoffice signaling message to said terminating access switch.

10. The apparatus of claim 9 wherein said means for accessing an interoffice signaling network comprises means for accessing a CCS7 network.

11. The apparatus of claim 9 wherein said means for establishing a voice connection to said telephone network comprises means for establishing a connection to a private telephone network.

12. The apparatus of claim 9, wherein a subscriber making said request to establish a telephone connection need not be provided with Internet service.

13. The apparatus of claim 9, wherein said network access switch comprising said apparatus is a toll access switch.

14. A method of establishing a voice connection between a subscriber connected to an originating switch, and a subscriber connected to a terminating switch, both switches having access to a telephone network and the Internet, comprising the steps of:

responsive to receipt of a request to establish a voice telephone connection for a call which can be established over the telephone network or the Internet, determining whether to establish the connection using a telephone network, or using the Internet;

if a decision is made to establish the connection using the telephone network, establishing the connection in accordance with procedures of the prior art;

if a decision is made to establish the connection using the Internet for transmitting an (IAM) initial address message over an inter-office signaling network to the terminating switch, the IAM including an Internet Protocol address of the originating switch;

responsive to receipt of said IAM, transmitting an acknowledgment message comprising an IP (Internet Protocol) address of said terminating switch over said interoffice signaling network;

establishing an Internet connection for carrying voice signals between said originating and said terminating switch, using said IP addresses; and confirming establishment of said connection by another interoffice signaling message between the two switches sent over said inter-office signaling network;

wherein the determining step comprises the step of determining based on the relative traffic states of the Internet and the telephone network.

15. The method of claim 14, wherein the determining step further comprises the step of determining based on dialed caller input.

16. The method of claim 14, wherein the determining step further comprises the step of determining based on caller class of service.

17. In an originating network access switch, apparatus for controlling the establishment of a voice connection to a terminating network access switch, wherein both network access switches have access to a telephone network and the Internet, comprising:

means for accessing an interoffice signaling network;

means for establishing a voice connection to said telephone network;

means for establishing a connection to the Internet;

processor means for controlling transmission of messages over said interoffice signaling network, for receiving messages from said interoffice signaling network, and for controlling said means for establishing a connection in said originating network access switch;

said processor means, operative under program control for:

responsive to receipt of a request to establish a telephone connection for a call which can be established over the telephone network or the Internet, determining whether to establish the connection using a telephone network, or using the Internet;

wherein the determining comprises based on the relative traffic states of the Internet and the telephone network;

if a decision is made to establish the connection using the telephone network, establishing the connection in accordance with procedures of the prior art;

if a decision is made to establish the connection using the Internet, controlling transmission of an initial address message over said interoffice signaling network to the terminating access switch, the IAM (initial address message), including an Internet Protocol address of the network access switch;

responsive to receipt of an acknowledgment message from said terminating access switch, said acknowledgment message comprising an IP (Internet Protocol) address of said terminating access switch over said interoffice signaling network, controlling the establishment of an Internet connection for carrying voice signals between said originating network access switch and said terminating network access switch, using said IP addresses; and confirming establishment of said connection by controlling transmission of another interoffice signaling message to said terminating access switch.

18. The apparatus of claim 17, wherein said determining further comprises determining based on caller input.

19. The apparatus of claim 17, wherein said determining further comprises determining based on caller class of service.

* * * * *